3,190,902
PREPARATION OF AROMATIC IRON SUBGROUP
      METAL COORDINATION COMPOUNDS
Thomas H. Coffield, Farmington, and George J. Burcal,
  Royal Oak, Mich., assignors to Ethyl Corporation, New
  York, N.Y., a corporation of Virginia
    No Drawing. Filed July 2, 1963, Ser. No. 292,431
              16 Claims. (Cl. 260—439)

This application is a continuation-in-part of applicants' prior application Serial No. 752,189, filed July 31, 1958, now abandoned.

This invention relates to aromatic metal coordination compounds and more specifically to the preparation of diaromatic iron-subgroup metal complexes.

Diaromatic iron complexes have been prepared in the past by two methods. The first method comprises reacting mesitylene with ferrous bromide in the presence of aluminum chloride. The diaromatic complex is isolated from this reaction mixture by hydrolysis and subsequent precipitation with a precipitating agent. The other known process comprises a reaction of an iron tetracarbonyl halide with an aromatic hydrocarbon in the presence of aluminum chloride.

The instant process, which comprises the reaction of an aromatic compound with an iron subgroup metal pentacarbonyl in the presence of a Friedel-Crafts catalyst, has many advantages when compared to the prior art methods. The first method discussed above (comprising the reaction of ferrous bromide) affords low yields of the desired products and, hence, is not desirable from a commercial viewpoint. Moreover, ferrous bromide is an extremely hygroscopic compound, and it is difficult to maintain large quantities of it in the anhydrous condition necessary for the process. Moreover, ferrous bromide is a solid and, hence, desired amounts of this compound are not readily measured out in an automated or semi-automated process. In other words, desired amounts of liquid reactants, such as those employed by applicants, are more readily ascertained (by a volume measurement) than desired quantities of solid compounds, which must be weighed.

Although the yields are increased when an iron tetracarbonyl halide is employed in place of a ferrous salt, the process comprising reacting a carbonyl halide is not completely adequate because of the high cost of the carbonyl halides. Iron tetracarbonyl halides can be prepared by reacting a ferrous salt such as ferrous bromide with carbon monoxide. This process is reversible and the preparation of the carbonyl halides thereby has never achieved commercial success due to the technical difficulties attendant with the process. Iron tetracarbonyl halides are usually prepared from iron pentacarbonyl by reacing that compound with a halogen such as chlorine, bromine or iodine. Hence, these reactants are more expensive than iron pentacarbonyl (employed by applicants) since they are prepared from applicants' reactant by an expensive intermediate step.

In contrast to the iron tetracarbonyl halides, iron pentacarbonyl is readily obtainable by reaction of metallic iron with carbon monoxide under pressure, preferably in the presence of a catalyst. Moreover, the use of iron pentacarbonyl for the preparation of diaromatic iron complexes is especially desirable for a manufacturer who has an integrated synthesis program which includes the preparation of iron pentacarbonyl.

Among the objects of this invention is the provision of an economical and simple process for preparation of diaromatic iron complexes. Other objects of this invention are to overcome the deficiencies within the prior art mentioned above. Additional objects will be apparent from the following discussion and claims.

The objects of this invention are accomplished by providing a process for the preparation of a bis(aromatic hydrocarbon) iron-subgroup metal coordination compound, said compound consisting of a cation and an anion, said cation consisting of an iron-subgroup metal ion and two aromatic hydrocarbon molecules bonded to said metal ion, said anion consisting of an electron acceptor salt complexed with a negatively charged disproportionation product of an iron subgroup metal pentacarbonyl, said process comprising reacting:

(A) at least one aromatic hydrocarbon having an isolated benzene nucleus and having from 6 to about 13 carbon atoms;
(B) an electron acceptor salt, and
(C) an iron-subgroup metal pentacarbonyl.

It is surprising that the process of the instant invention is operative. Both of the prior art processes comprise the preparation of a complex which consists of a diaromatic iron cation and an anion derived from aluminum chloride by complexation of that compound with the halide anion afforded by the iron reactants. Hence, the known process for the preparation of these compounds from ferrous bromide can be illustrated by the following equation wherein Ar is an aromatic compound.

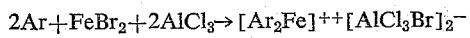

(I)

The same product is obtained when iron tetracarbonyl bromide is reacted in place of ferrous bromide.

The instant process is distinct from these known methods since the iron-subgroup metal reactants employed by applicants do not contain halogen. Hence, the complexes prepared by applicants are dissimilar from those obtained by the processes of the prior art. Moreover, the metal within the metal carbonyl reactants is zero valent while the iron-subgroup metal in the cation of the products is divalent. Hence, applicants' process comprises the oxidation of the metal reactant without the use of an oxidizing agent. This oxidation occurs by a disproportionation of the metal reactant. Although not bound by any theory, it is believed that the disproportionation inherent in the instant process can be illustrated by the following equation.

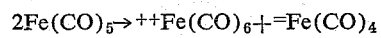

(II)

As illustrated above, the iron atom within one molecule of iron pentacarbonyl achieves a divalent positive charge with a concurrent reduction of an iron atom within another molecule of iron pentacarbonyl to a divalent negative charge. Hence, applicants' process can be illustrated by the equation below.

$2Ar + 2Fe(CO)_5 + 2AlCl_3$

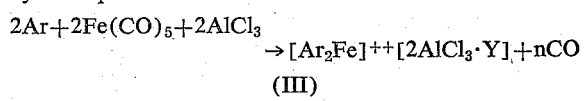

(III)

In this equation Ar has the same significance as above, Y indicates a negatively charged disproportionation product of iron pentacarbonyl and $n$ is equal to 10 minus the number of carbonyl groups within the disproportionation product. Although still not bound by any theory, it is believed that the anion within the complexes afforded by applicants can be illustrated by $$[2AlCl_3 \cdot Fe(CO)_4]^=$$

In any event, the complex anion within applicants' products are distinct from the anions of the products of the prior art since applicants' anions include two metals. For example, as illustrated above, the anions prepared when iron pentacarbonyl is employed in the instant process contain both aluminum and iron. Similar complex anions of ruthenium and aluminum, and osmium and aluminum are prepared.

The process of this invention is widely applicable to aromatic compounds. However, it is most useful when applied to aromatic compounds having an isolated benzene nucleus and from 6 to about 13 carbon atoms. An aromatic compound having an isolated benzene nucleus is free of aliphatic unsaturation on a carbon atom adjacent to the benzene ring and does not contain unsaturation on a carbon atom in a ring fused to the benzene nucleus. Thus, the process is applicable to aromatic compounds such as benzene, toluene, o-, m-, and p-xylene, mesitylene, 1,2,3-trimethylbenzene, durene, pentamethylbenzene, ethylbenzene, isopropylbenzene (cumene), tert-butylbenzene, 1,3-diethylbenzene, 3-ethylcumene, heptylbenzene, diphenyl and the like. Moreover, aromatic compounds of the type described and illustrated above and which contain non-aromatic substituents such as halogen or ether, ester and amino linkages, are also applicable.

The preferred metal reactants employed in the process are the pentacarbonyls of iron, ruthenium, and osmium. Other simple metal carbonyls such as iron enneacarbonyl, osmium enneacarbonyl, and ruthenium enneacarbonyl and the like are also applicable.

The process of this invention is carried out in the presence of an electron acceptor salt commonly known as a Friedel-Crafts catalyst. It is believed that these materials catalyze the disproportionation of the metal carbonyl reactant illustrated above. Salts of this type are Lewis acids and can be defined as salts which have strong electrophilic characteristics. Preferably, metal halides are employed. Applicable halides include the dihalides of Groups IIA and IIB metals, the trihalides of the Groups IIIA and VIII elements, the tetrahalides of the Groups IVA and IVB metals, and the pentahalides of the Group VB elements. Illustrative examples of preferred metal halides are zinc dichloride, aluminum trichloride, aluminum tribromide, titanium tetrachloride, tin tetrachloride, iron trichloride and the like.

In conducting the process of this invention it is desirable to use an excess of the electrophilic salts of the type described and illustrated above. Generally speaking, about two moles of a salt is employed per mole of iron subgroup metal pentacarbonyl reactant. Greater quantities of these electron acceptor salts can be employed if desired. Similarly, lesser quantities may be employed; however, this decreases the yield in many instances.

In this process the aromatic compound serves as a reactant and as a solvent and carrier for the catalysts and iron carbonyl reactants. Thus, it is preferable to use an excess of the aromatic compound. Ordinarily, from about a two-fold to about a 20-fold excess is used. When the aromatic compound is a solid, the reaction mixture can be heated as a heterogeneous mass to above the melting point of the particular aromatic compound employed or another inert solvent can be used.

Usually an inert solvent is not necessary. Typical solvents that may be employed are the inert organic solvents such as a paraffinic hydrocarbon, e.g., isooctane or a mixture thereof such as petroleum ether.

As illustrated above, when an iron subgroup metal pentacarbonyl is reacted with an aromatic compound in the presence of an electron acceptor salt, a complex is formed which consists of the diaromatic metal divalent cation and an anion comprising the electron acceptor salt complexed with a negatively charged disproportionation product of the metal pentacarbonyl. Usually, the diaromatic iron cation is not isolated when bound to this complex anion. Isolation of the cation is conveniently carried out by hydrolysis of the product with a source of active hydrogen such as water or an aqueous acid to put the cation in a more water-soluble form. The water-soluble diaromatic cation may then be reacted with various ionic compounds and the resultant diaromatic iron-subgroup compound recovered. When it is desired to recover the diaromatic cation in the solid state, the water-soluble salt can be reacted with a salt that affords relatively insoluble complexes of the diaromatic cation. Examples of salts of this type are the alkali metal iodides, triiodides, perchlorates, picrates, tetraphenylborates, Reineckates and the like. The treatment of the diaromatic iron-subgroup metal reactant with other salts results in the preparation of diaromatic iron-subgroup metal compounds of varying solubility. Other anions which can be employed include nitrate, sulfate or other inorganic ions. Likewise, the anions of these salts can be derived from an organic compound, particularly an organic acid such as a long-chain aliphatic acid such as stearate, laurate and oleate, and aromatic acids such as benzoate, p-methylbenzoate and the like.

The reaction temperature employed in the process of this invention depends somewhat upon the nature of the reactants and products. In general, temperatures within the range of from about 70 to about 250° C. are employed. A preferred temperature range is from about 80 to about 185° C. It is often advantageous to conduct the reaction at the reflux temperature of the mixture, particularly when the reflux temperature is within the preferred range for conducting the process.

Reaction times of from a few minutes to about ten hours may be employed. However, reaction times of from about one-half hour to about two hours constitutes a preferred time range. Moreover, the reaction time is not a truely independent variable and is dependent to some extent upon the other variables such as the nature of the reactants and the temperature used in the process.

The process of this invention is illustrated by the following examples in which all parts and percentages are by weight unless otherwise indicated.

*Example I*

Aluminum chloride, 133 parts, was added to a solution of 98 parts of iron pentacarbonyl in about 865 parts of mesitylene. Upon addition of the aluminum chloride, bubbles formed at the solid interface. Upon heating at reflux, gas evolved rapidly. When 32.5 parts of gas had been given off, the heating was discontinued. At this time, the aluminum chloride was completely dissolved. After cooling, the resultant mixture was hydrolyzed with 500 parts of water. Upon the addition of solid potassium iodide to the water layer, 28 parts of red crystals were obtained. These crystals were identified as dimesitylene iron diiodide by their infrared spectrum.

A similar reaction mixture is reacted and hydrolyzed as above. Upon addition of Reinecke's salt to this reaction mixture, dimesitylene iron diReineckate is produced. The compound is red-brown, soluble in acetone and insoluble in water.

In a similar manner, dimesitylene iron ditetraphenylborate is produced by the addition of sodium tetraphenylborate to the hydrolyzed reaction mixture. The compound is red-orange, soluble in acetone and insoluble in water. Dimesitylene iron distearate and dimesitylene iron dilaurate are prepared by the addition of sodium stearate and sodium laurate respectively to a hydrolyzed reaction mixture prepared as above.

| Example | Aromatic compound | Metal reactant | Electrophilic salt | Reaction temp., °C. | Precipitant | Product |
|---|---|---|---|---|---|---|
| 2 | Benzene | Fe(CO)₅ | AlCl₃ | 80 | KI | Dibenzene iron diiodide. |
| 3 | Toluene | Fe(CO)₅ | AlCl₃ | 110 | KI₃ | Ditoluene iron di(triiodide). |
| 4 | o-Xylene | Fe(CO)₅ | AlCl₃ | 144 | KClO₄ | Di(o-xylene)iron diperchlorate. |
| 5 | p-Xylene | Fe(CO)₅ | SnCl₄ | 138 | Potassium picrate | Di(p-xylene)iron dipicrate. |
| 6 | Ethylbenzene | Fe(CO)₅ | FeCl₃ | 136 | Sodium tetraphenylborate | Di(ethylbenzene)iron ditetraphenylborate. |
| 7 | Propylbenzene | Os(CO)₅ | AlCl₃ | 160 | NaI | Di(propylbenzene)osmium dipicrate. |
| 8 | 4-propyltoluene | Os(CO)₅ | NbCl₅ | 160 | Reinecke's salt | Di(propyltoluene)osmium diReineckate. |
| 9 | Sec-butylbenzene | Ru(CO)₅ | ZrBr₄ | 165 | do | Di(sec-butylbenzene)ruthenium diReineckate. |
| 10 | Tetralin | Fe(CO)₅ | ZnCl₂ | 170 | do | Di(tetralin)iron diReineckate. |
| 11 | Heptylbenzene | Fe(CO)₅ | TiBr₄ | 175 | do | Di(heptylbenzene)iron diReineckate. |
| 12 | Pentamethylbenzene | Ru(CO)₅ | BF₃ | 185 | do | Di(pentamethylbenzene)ruthenium diReineckate. |
| 13 | Biphenyl | Ru(CO)₅ | BF₃ | 175 | KI | Di(biphenyl)ruthenium diiodide. |
| 14 | Anisole | Os(CO)₅ | FeCl₃ | 155 | Na[CyCr(CO)₃] | Di(anisole)osmium di(cyclopentadienylchromium tricarbonyl). |

The compounds produced by this process have utility as agents in improving the operation of the internal combustion engine. Since the compounds are ionic it is generally preferred to take advantage of this utility by injecting the new compounds directly into the combustion chamber of the internal combustion engine as an aqueous solution or suspension. When injected into the chamber in such a fashion it is found that the new compounds exhibit potent antiknock activity and also provide important deposit modification effects. Ordinarily we prefer to inject the material directly into the combustion chamber as a separate stream rather than via the gasoline-air mixture. In general, it is preferable to provide a separate entrance for this injection which is coupled with the ordinary inlet valve of the combustion chamber so that the additive is introduced into the chamber simultaneously with the fuel-air mixture. When introduced in such a manner and with such timing, best results in terms of antiknock enhancement of the fuel are found. For good deposit modification control with concomitant benefits in reduction of surface ignition, spark plug fouling, and the like, the timing of injection of the new compound into the chamber is not as important and it is not necessary to coincide its injection with that of the fuel-air mixture. No doubt this is due to the fact that these effects are at least in part obtained via chamber deposits formed by combustion of our compounds.

As an illustration of the above, we provide an ordinary internal combustion engine with a separate inlet line to the combustion chamber which is connected at its opposite extremity with a tank containing approximately 100 milliliters of a two percent solution of ditoluene iron dichloride in water. This supply tank is pressurized with nitrogen at 2000 p.s.i. In the line connecting the supply tank with the combustion chamber is located a shut-off valve linked to the gasoline inlet valve so that the valve in the supplementary line is open when the inlet valve is open, and closed when the inlet valve is closed. The size of the line from the supply tank to the combustion chamber is such that one milliliter of aqueous solution is injected into the combustion chamber for each 100 milliliters of gasoline-air mixture. Operation in this manner is found to enhnace the antiknock activity of the gasoline.

As an alternative arrangement, the supply of aqueous solution can be injected into the gasoline intake manifold system and then swept into the combustion chamber with the gasoline.

Some of the diaromatic iron compounds, particularly those wherein the anion is composed of a long chain organic radical, are soluble in gasoline and can be used directly therein as a fuel additive.

The diaromatic metal compounds of this invention are also useful in wax compositions for the preparation of candles which burn with a minimum of soot formation. For this purpose, from about 0.005 to about 7 percent iron as a compound of this invention is incorporated into the wax composition prior to fabrication of the candle. The candles containing the iron compounds of this invention are preferably prepared from paraffin wax or compositions containing a major proportion of paraffin wax. However, other materials may be incorporated into the paraffin wax with equally good results. Other waxes, stearic acid, hydrostearic acid, beeswax, microcrystalline wax, ceresin, β-naphthol, and the like, including mixtures, may be used along with the paraffin wax. As an illustrative example, a candle is prepared from a paraffin wax having a melting point of about 55° C. by adding thereto 6 percent stearic acid, 10 percent hydrostearic acid, and 2 percent iron as ditoluene iron distearate. A candle molded from this composition burns with a minimum of soot formation. When used as an additive to candles, it is preferred to employ compounds of this invention wherein the anion is derived from an organic acid. Particularly preferred compounds are those wherein the anion is derived from a long chain fatty acid, such as maleic acid, stearic acid, hydrostearic acid, and the like.

Having fully described the novel process of this invention, the compounds produced thereby, and their many utilities, we desire to be limited only within the lawful scope of the appended claims.

We claim:

1. Process for the preparation of a bis(aromatic hydrocarbon) iron-subgroup metal coordination compound, said compound consisting of a cation and an anion, said cation consisting of an iron-subgroup metal ion and two aromatic hydrocarbon molecules bonded to said metal ion, said anion consisting of a Friedel-Crafts catalyst complexed with a negatively charged disproportionation product of an iron subgroup metal pentacarbonyl, said negatively charged disproportionation product having the formula $M(CO)_4^=$ wherein M is an iron-subgroup metal, said process comprising reacting:

(A) at least one aromatic hydrocarbon having an isolated benzene nucleus and having from 6 to about 13 carbon atoms;

(B) a Friedel-Crafts catalyst, and (C) an iron-subgroup metal pentacarbonyl.

2. Process for the preparation of a bis(aromatic hydrocarbon) iron-subgroup metal coordination compound, said compound consisting of a cation and an anion, said cation consisting of an iron-subgroup metal ion and two aromatic hydrocarbon molecules bonded to said metal ion, said anion consisting of a Friedel-Crafts catalyst complexed with a negatively charged disproportionation product of an iron subgroup metal pentacarbonyl, said negatively charged disproportionation product having the formula $M(CO)_4^=$ wherein M is an iron-subgroup metal, said process comprising reacting:

(A) at least one aromatic hydrocarbon having from 6 to about 13 carbon atoms, said hydrocarbon selected from the class consisting of benzene, alkyl-substituted benzenes and diphenyl;
(B) a Friedel-Crafts catalyst, and
(C) an iron-subgroup metal pentacarbonyl.

3. Process for the preparation of a bis(aromatic hydrocarbon) iron-subgroup metal coordination compound, said compound consisting of a cation and an ion, said cation consisting of an iron-subgroup metal ion and two aromatic hydrocarbon molecules bonded to said metal ion, said anion consisting of an electron acceptor salt complexed with a negatively charged disproportionation product of an iron-subgroup metal pentacarbonyl, said negatively charged disproportionation product having the formula $M(CO)_4^=$ wherein M is an iron-subgroup metal, said process comprising reacting:
(A) at least one aromatic hydrocarbon having an isolated benzene nucleus and having from 6 to about 13 carbon atoms;
(B) a halide salt having strong electrolphilic characteristics selected from the class consisting of Group IIIA, IIB, IIA, IVB, VB, VIIB and VIII metal halides, and
(C) an iron-subgroup metal pentacarbonyl.

4. Process for the preparation of a bis(aromatic hydrocarbon) iron coordination compound, said compound consisting of a cation and an anion, said cation consisting of an iron ion and two aromatic hydrocarbon molecules bonded to said iron ion, said anion consisting of a Friedel-Crafts catalyst complexed with a negatively charged disproportionation product of iron pentacarbonyl, said negatively charged disproportionation product having the formula $Fe(CO)_4^=$, said process comprising reacting:
(A) at least one aromatic hydrocarbon having from 6 to about 13 carbon atoms, said hydrocarbon being selected from the class consisting of benzene, alkyl-substituted benzenes and diphenyl;
(B) a Friedel-Crafts catalyst, and
(C) iron pentacarbonyl.

5. Process for the preparation of a bis(aromatic hydrocarbon) iron coordination compound, said compound consisting of a cation and an anion, said cation consisting of an iron ion and two aromatic hydrocarbon molecules bonded to said iron ion, said anion consisting of an electron acceptor salt complexed with a negatively charged disproportionation product of iron pentacarbonyl, said negatively charged disproportionation product having the formula $Fe(CO)_4^=$, said process comprising reacting:
(A) at least one aromatic hydrocarbon having an isolated benzene nucleus and from 6 to about 13 carbon atoms, said hydrocarbon being selected from the class consisting of benzene, alkyl-substituted benzenes and biphenyl;
(B) a halide salt having strong electrolphilic characteristics selected from the class consisting of Group IIA, IIB, IIIA, IV, VB, VIIB and VIII metal halides, and
(C) iron pentacarbonyl.

6. Process for the preparation of a bis(aromatic hydrocarbon) iron coordination compound, said compound consisting of a cation and an anion, said cation consisting of an iron ion and two aromatic hydrocarbon molecules bonded to said iron ion, said anion consisting of aluminum chloride complexed with a negatively charged disproportionation product of iron pentacarbonyl, said negatively charged disproportionation product having the formula $Fe(CO)_4^=$, said process comprising reacting:
(A) at least one aromatic hydrocarbon having an isolated benzene nucleus and from 6 to about 13 carbon atoms, said hydrocarbon being selected from the class consisting of benzene, alkyl substituted benzenes and biphenyl;
(B) aluminum chloride, and
(C) iron pentacarbonyl.

7. Process for the preparation of a bis(mestiylene) iron coordination compound, said compound comprising a cation an anion, said cation consisting of an iron ion and two mesitylene molecules bonded to said iron ion, said anion consisting of aluminum chloride complexed with a negatively charged disproportionation product of iron pentacarbonyl, said negatively charged disproportionation product having the formula $Fe(CO)_4^=$, said process comprising reacting mesitylene with aluminum chloride and iron pentacarbonyl.

8. The process of claim 7 being carried out at the reflux temperature of the system.

9. Process for the preparation of a bis(aromatic hydrocarbon) iron salt, said salt consisting of a cation and an anion, said cation consisting of an iron ion and two aromatic hydrocarbon molecules bonded to said iron ion, said anion selected from the class consisting of iodide, triiodide, perchlorate, picrate, tetraphenyl borate, and Reineckate, said process comprising reacting at least one aromatic hydrocarbon having an isolated benzene nucleus and from 6 to about 13 carbon atoms with aluminum chloride and iron pentacarbonyl to form an intermediate compound consisting of said cation and a complex anion, said complex anion consisting of aluminum chloride bonded to a negatively charged disproportionation product of iron pentacarbonyl, said negatively charged disproportionation product having the formula $Fe(CO)_4^=$, subsequently hydrolyzing said intermediate compound; and contacting the resultant hydrolyzed mixture with a precipitant, said precipitant selected from the class consisting of alkali metal iodides, triiodides, perchlorates, picrates, Reineckates and tetraphenylborates.

10. Process for the preparation of dimesitylene iron diiodide, said process comprising reacting mesitylene with aluminum chloride and iron pentacarbonyl; hydrolyzing the product thus formed with a source of active hydrogen and subsequently adding potassium iodide to precipitate said dimesitylene iron diiodide.

11. Process for the preparation of a bis(aromatic hydrocarbon) iron subgroup metal salt, said process comprising reacting:
(A) at least one aromatic hydrocarbon having an isolated benzene nucleus and having from 6 to about 13 carbon atoms;
(B) a Friedel-Crafts catalyst, and
(C) an iron-subgroup metal pentacarbonyl;
hydrolyzing the product thus formed; and subsequently contacting the resultant hydrolyzed mixture with a precipitant selected from the class consisting of alkali metal iodides, triiodides, perchlorates, picrates, Reineckates, and tetraphenylborates.

12. Process for the preparation of a bis(aromatic hydrocarbon) iron subgroup metal salt, said process comprising reacting:
(A) at least one aromatic hydrocarbon having from 6 to about 13 carbon atoms, said hydrocarbon being selected from the class consisting of benzene, alkyl-substituted benzenes and diphenyl;
(B) a Friedel-Cafts catalyst, and
(C) an iron-subgroup metal pentacarbonyl;
hydrolyzing the product thus formed; and subsequently contacting the resultant hydrolyzed mixture with a precipitant selected from the class consisting of alkali metal iodides, triiodides, perchlorates, picrates, Reineckates, and tetraphenylborates.

13. Process for the preparation of a bis(aromatic hydrocarbon) iron subgroup metal salt, said process comprising reacting:
(A) at least one aromatic hydrocarbon having an isolated benzene nucleus and having from 6 to about 13 carbon atoms;
(B) a halide salt having strong electrolphilic characteristics selected from the class consisting of Group IIA, IIB, IIIA, IVB, VB, VIIB and VIII metal halides, and
(C) an iron-subgroup metal pentacarbonyl;
hydrolyzing the product thus formed; and subsequently contacting the resultant hydrolyzed mixture with a precipitant selected from the class consisting of alkali metal iodides, triiodides, perchlorates, picrates, Reineckates, and tetraphenylborates.

14. Process for the preparation of a bis(aromatic hydrocarbon) iron subgroup metal salt, said process comprising reacting:
(A) at least one aromatic hydrocarbon having from 6 to about 13 carbon atoms, said hydrocarbon being selected from the class consisting of benzene, alkyl-substituted benzenes and diphenyl;
(B) a Friedel-Crafts catalyst, and
(C) iron pentacarbonyl;
hydrolyzing the product thus formed; and subsequently contacting the resultant hydrolyzed mixture with a precipitant selected from the class consisting of alkali metal iodides, triiodides, perchlorates, picrates, Reineckates, and tetraphenylborates.

15. Process for the preparation of a bis(aromatic hydrocarbon) iron subgroup metal salt, said process comprising reacting:
(A) at least one aromatic hydrocarbon having an isolated benzene nucleus and from 6 to about 13 carbon atoms, said hydrocarbon being selected from the class consisting of benzene, alkyl-substituted benzenes and biphenyl;
(B) a halide salt having strong electrophilic characteristics selected from the class consisting of Group IIA, IIB, IIIA, IV, VB, VIIB, and VIII metal halides, and
(C) iron pentacarbonyl;
hydrolyzing the product thus formed; and subsequently contacting the resultant hydrolyzed mixture with a precipitant selected from the class consisting of alkali metal iodides, triiodides, perchlorates, picrates, Reineckates, and tetraphenylborates.

16. Process for the preparation of a bis(aromatic hydrocarbon) iron subgroup metal salt, said process comprising reacting:
(A) at least one aromatic hydrocarbon having an isolated benzene nucleus and from 6 to about 13 carbon atoms, said hydrocarbon being selected from the class consisting of benzene, alkyl substituted benzenes and biphenyl;
(B) aluminum chloride, and
(C) iron pentacarbonyl;
hydrolyzing the product thus formed; and subsequently contacting the resultant hydrolyzed mixture with a precipitant selected from the class consisting of alkali metal iodides, triiodides, perchlorates, picrates, Reineckates, and tetraphenylborates.

References Cited by the Examiner

UNITED STATES PATENTS

| | | | |
|---|---|---|---|
| 2,791,597 | 5/57 | Anzilotti et al. | 260—439 |
| 2,953,586 | 9/60 | Hafner et al. | 260—429 |
| 3,101,360 | 8/63 | Parts et al. | 260—439 |

OTHER REFERENCES

Fischer (I), Chemistry and Industry, March 3, 1956, pages 153–154.

Fischer (II), Berichte Deut. Chem., vol. 89, 1956, pages 2397–2400.

Piper et al., J. Inorg. and Nuc. Chem., vol. 3, 1956, page 104.

TOBIAS E. LEVOW, *Primary Examiner*.